United States Patent [19]
Burchi et al.

[11] Patent Number: 5,762,842
[45] Date of Patent: Jun. 9, 1998

[54] PROCESS FOR SEAT PRODUCTION

[76] Inventors: Charles R. Burchi, 1275 Vanstone St., Commerce, Mich. 48382; Keith Hill, 1127 Ferris St., Royal Oak, Mich. 48067

[21] Appl. No.: 706,433

[22] Filed: Aug. 30, 1996

[51] Int. Cl.$^6$ .................... B29C 44/06; B29C 44/12
[52] U.S. Cl. .................. 264/46.4; 29/91.1; 264/46.7; 264/276
[58] Field of Search ............... 264/46.4, 46.7, 264/276, 46.6; 29/91.1

[56] References Cited

U.S. PATENT DOCUMENTS

| | | | |
|---|---|---|---|
| 3,304,273 | 2/1967 | Stamberger | 260/2.5 |
| 3,383,351 | 5/1968 | Stamberger | 260/33.2 |
| 3,523,093 | 8/1970 | Stamberger | 260/2.5 |
| 3,939,106 | 2/1976 | Dunleavy et al. | 260/2.5 |
| 4,107,106 | 8/1978 | Dunleavy et al. | 521/164 |
| 4,134,610 | 1/1979 | Lindewall | 293/71 |
| 4,190,712 | 2/1980 | Flanagan | 521/137 |
| 4,268,557 | 5/1981 | Bracesco | 264/46.7 |
| 4,420,447 | 12/1983 | Nakashima | 264/46.4 |
| 4,501,541 | 2/1985 | Bethell et al. | 425/117 |
| 4,593,880 | 6/1986 | Smith et al. | 249/91 |
| 4,765,045 | 8/1988 | Selbert et al. | 29/91.1 |
| 4,824,070 | 4/1989 | Mizuno et al. | 249/93 |
| 4,839,117 | 6/1989 | Swenson et al. | 264/46.4 |
| 4,873,036 | 10/1989 | Urai | 264/46.6 |
| 5,005,242 | 4/1991 | Kennedy et al. | 264/46.7 |
| 5,017,115 | 5/1991 | Yanagishita et al. | 264/46.4 |
| 5,085,568 | 2/1992 | Turgeon et al. | 425/125 |
| 5,089,191 | 2/1992 | Hughes | 264/46.5 |
| 5,096,639 | 3/1992 | Hughes | 264/46.5 |
| 5,132,063 | 7/1992 | Hughes | 264/46.4 |
| 5,143,667 | 9/1992 | Matsuura et al. | 264/46.4 |
| 5,158,634 | 10/1992 | Kasuya | 264/46.7 |
| 5,176,860 | 1/1993 | Storch | 264/46.7 |
| 5,356,580 | 10/1994 | Clark et al. | 264/51 |
| 5,389,316 | 2/1995 | Kerman | 264/46.5 |
| 5,397,517 | 3/1995 | Jay et al. | 264/46.7 |
| 5,400,490 | 3/1995 | Burchi | 264/46.4 |
| 5,482,721 | 1/1996 | Clark et al. | 425/4 R |
| 5,542,747 | 8/1996 | Burchi | 297/452.55 |

FOREIGN PATENT DOCUMENTS

| | | | |
|---|---|---|---|
| 788115 | 2/1973 | Belgium . | |
| 785835 | 5/1968 | Canada . | |
| 2610729 | 9/1977 | Germany | 264/46.7 |
| 3704528 | 2/1988 | Germany | 264/46.8 |
| 55-107436 | 8/1980 | Japan | 264/46.7 |
| 58-65637 | 4/1983 | Japan . | |
| 61-35912 | 2/1986 | Japan | 264/46.7 |
| 4-314530 | 11/1992 | Japan . | |

*Primary Examiner*—Allan R. Kuhns
*Attorney, Agent, or Firm*—Fitzpatrick, Cella, Harper & Scinto

[57] ABSTRACT

A passenger seat comprising: a frame element, vehicle anchorage means connected to the frame element, a seat body comprising a resilient material fixed with respect to the frame element and trim cover attachment means, the trim cover attachment means comprising a relatively high density, rigid foam member having a groove disposed in a surface thereof, the groove capable of receiving connection means comprised in a trim cover. A process, system and mold for producing a passenger seat are also described.

20 Claims, 6 Drawing Sheets

5,762,842

1

PROCESS FOR SEAT PRODUCTION

BACKGROUND OF THE INVENTION

1. Field of the Invention

In one of its aspects, the present invention relates to a seat and particularly, to a passenger seat for use in vehicles. More specifically, the present invention relates to a novel passenger seat for vehicles having an improved trim cover attachment system. In another of its aspects, the present invention relates to a process for producing a passenger seat, particularly a passenger seat for use in vehicles. In yet another of its aspects, the present invention relates to a system for producing a passenger seat, particularly a passenger seat for use in vehicles. In yet another of its aspects, the present invention relates to a mold for producing a passenger seat, particularly a passenger seat for use in vehicles.

2. Description of the Prior Art

Passenger seats in vehicles, such as automobiles, are typically fabricated from a foam (usually polyurethane) material which is molded into the desired shape and covered with an appropriate trim cover. The foamed material is selected to provide passenger comfort by providing a resilient seat and the trim cover is selected to provide the desired aesthetic properties.

To meet desired safety standards, passenger seats in vehicles such as automobiles now often provide anti-"submarine" properties. Submarining is the term used to describe the tendency of the pelvis of a seated passenger to move forward and down during a collision. When the passenger is wearing a shoulder harness of lap type seatbelt, this tendency can result in the seatbelt strangling the passenger with potentially fatal consequences. Accordingly, it is known in the art to design passenger seats with anti submarine properties. These properties may be provided by rigid or semi-rigid members embedded in the seat and which provide additional pelvic support to the passenger during a collision. To function properly, these members cannot move and thus, must be fixed (directly or indirectly) to the vehicle.

It is also known in the art that, while the resiliency of the foamed material in the seat provides passenger comfort, it does not provide the necessary structural strength for the seat. This necessitates additional reinforcement of the seat to provide the degree of structural strength required to ensure proper mounting of the seat within the vehicle and proper support of anti-submarine elements. Accordingly, prior art vehicular seats typically include a perimeter frame which strengthens the seat. Further, support rails are typically mounted across the metal frame to stiffen the frame and to provide a suitable attachment point for the means used to anchor the seat to the vehicle. Conventionally, the metal frame and/or support rails are substantially completely embedded in the foam material when the seat is molded. In many cases, the metal frame will further comprise a plurality of apertures or other means for attaching a trim cover to the seat.

Of course, the requirement for such a perimeter metal frame and for support rails adds to the cost of manufacturing the seat and, more importantly, adds to the weight of the seat and the overall weight of the vehicle in which it is installed. This added weight increases both the cost of shipping the seat to the vehicle manufacturer and the eventual lifetime operating expense for the vehicle. Finally, the presence of metal frame and support rails or other components in the seat hampers the eventual recycling of the seat materials which is becoming increasingly important in today's environmentally concerned marketplace.

2

U.S. Pat. Nos. 5,400,490 [Burchi] and 5,542,747 [Burchi], issued Mar. 28, 1995 and Aug. 6, 1996, respectively, the contents of each of which are hereby incorporated by reference, describe a passenger seat comprising a frame element molded from relatively high density, rigid foam; vehicle anchorage means connected to the frame element; and a seat body comprising a resilient material fixed with respect to the frame element. The provision of a frame element molded from relatively high density, rigid foam obviates the need for a conventional metal frame. The '490 and '747 patents also teach application of a trim cover to passenger seat. The trim cover may be attached using push pins or a combination of bottom flaps (see FIGS. 3 and 9 in the '490 and '747 patents) with conventional mechanical attachment means (e.g. Velcro™, J-retainers or push pins).

While the invention taught in the '490 and '747 patents represents a significant advance in the art, there is still room for improvement. One such area is in the attachment of the trim cover to the passenger seat. Specifically, in certain cases, for a number of reasons, it can be advantageous to avoid the use of push pins to attach the trim cover as taught in the '490 and '747 patents. First, the trim cover may have to be pre-drilled or otherwise pre treated to permit penetration of the push pins, involving additional manufacturing cost (this is especially true for trim covers made of an impermeable material such as vinyl or leather). Second, a large number of push pins is required to adequately secure the trim cover to the relatively high density, rigid foam frame, involving additional manufacturing cost, both in materials and labour. Third, the trim cover must be correctly positioned over the resilient material and the relatively high density, rigid foam frame independently of placement of the push pins, increasing the likelihood for improper placement and attachment of the trim cover.

Therefore, it would be desirable to have a passenger seat, particularly a vehicle seat, which comprises an improved trim cover attachment system. It would be further desirable if such a seat could be produced using an improved process and mold.

SUMMARY OF THE INVENTION

Accordingly, in one of its aspects, the present invention provides a passenger seat comprising: a frame element, vehicle anchorage means connected to the frame element, a seat body comprising a resilient material fixed with respect to the frame element and trim cover attachment means, the trim cover attachment means comprising a relatively high density, rigid foam member having a groove disposed in a surface thereof, the groove capable of receiving connection means comprised in a trim cover.

In another of its aspects, the present invention provided a process for producing a passenger seat in a mold comprising a first mold half and a second mold half engageable to define a mold cavity, the process comprising the steps of:

(i) placing a frame element in the first mold half, the frame element having connected thereto vehicle anchorage means;

(ii) placing trim cover attachment means in the first mold half;

(iii) dispensing a liquid foamable polymeric composition in at least one of the first mold half and the second mold half;

(iv) closing the first mild half and the second mold half;

(v) sealing at least a portion of the trim cover attachment means with respect to the liquid foamable polymeric composition; and (vi) allowing the liquid foamable polymeric composition to expand to fill substantially the mold cavity to produce a relatively low density, resilient seat body which is fixed to at least a portion of the frame element.

wherein at least one of the following conditions is met:
(A) the frame element comprises a relatively high density rigid foam, or (B) the trim cover attachment means is a relatively high density, rigid foam member comprising a relatively high density, rigid foam member having a groove disposed in a surface thereof, the groove capable of receiving connection means comprised in the trim cover.

In yet another of its aspects, the present invention provides a system for production of a passenger seat, the system comprising:

a first mold for producing a frame element constructed of a relatively high density, rigid foam, the first mold comprising a first mold half and a second mold half engageable to define a frame mold cavity, the first mold half adapted to convey to the frame element a trim cover attachment means disposed at a position corresponding to at least a portion of a periphery of the frame element and vehicle anchorage means;

a second mold for adhering the frame element to a relatively low density, resilient foam, the second mold comprising a third mold half and a fourth mold half engageable to define a seat mold cavity, the third mold half adapted to carry the frame element in a manner such that trim cover attachment means in the frame element is adjacent to an interior surface of the third mold half, the third mold half further comprising sealing means on the interior surface at a location relatively peripheral to a position corresponding to the trim cover attachment means in the frame element.

In yet another of its aspects, the present invention provides a mold for production of a passenger seat comprising a frame element constructed of a relatively high density, rigid foam and comprising trim cover attachment means, the mold comprising a first mold half and a second mold half engageable to define a mold cavity, the first mold half adapted to carry the frame element in a manner such that trim cover attachment means in the frame elements is adjacent to an interior surface of the first mold half, the first mold half further comprising sealing means on the interior surface at a location relatively peripheral to a position corresponding to the trim cover attachment means in the frame element.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Accordingly, an aspect of the present invention relates to passenger seat. As used herein the term "seat" is intended to have its conventional meaning and includes one or both of a cushion (i.e. the portion of the seat on which the occupant sits), and a back or back rest (i.e. the portion of the seat which supports the back of the occupant). As is known in the automotive, airline and related industries, a "seat" includes both a cushion and a back (or backrest). Thus, as used herein, the term "seat" includes a cushion, a back (or back rest) or a unit construction comprising a cushion and a back (or backrest).

Figure 1:
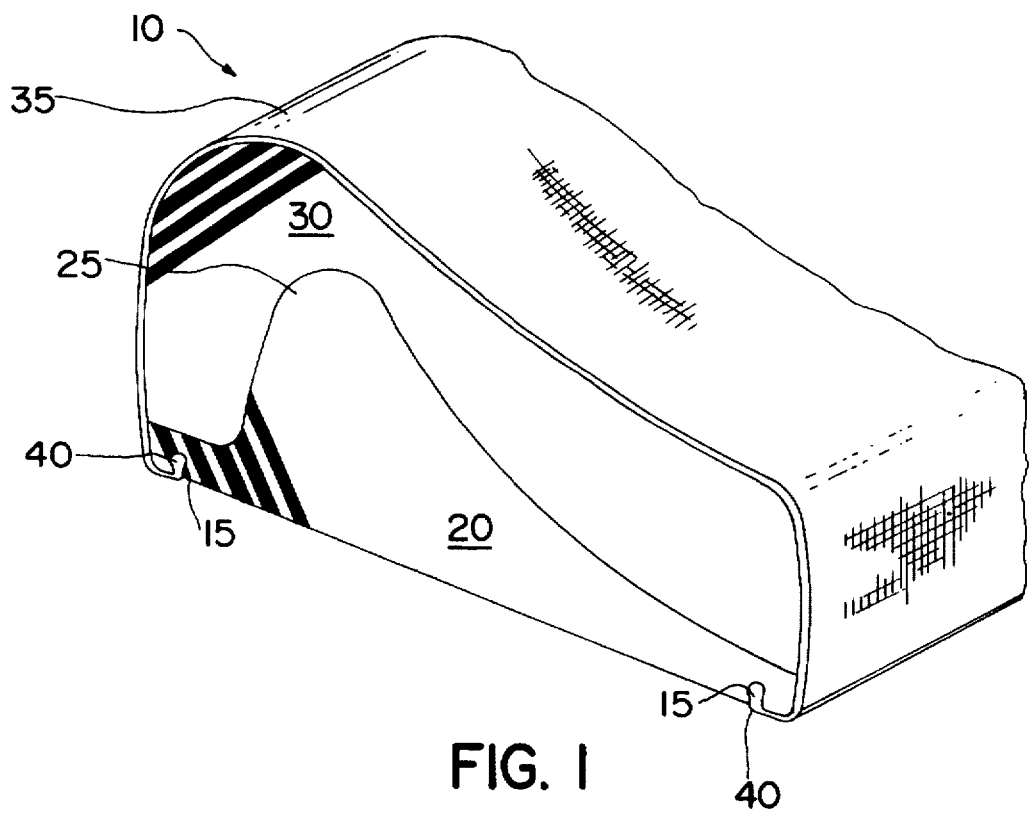
FIG. 1 illustrates a perspective view, in cross-section, of an embodiment of the present passenger seat.

With reference to FIG. 1, there is illustrated a passenger seat 10. Passenger seat 10 comprises a frame element 20. Frame element 20 included a groove 15 and a pelvic support 25. Frame element 20 is constructed of a relatively high density, rigid foam. Such a foam is discussed in the Burchi patents discussed above and incorporated herein by reference. Preferably, frame element 20 is constructed of a foam having an indentation force deflection at 25% deflection in the range of from about 150 to about 4000 pounds, more preferably from about 500 to about 2500 pounds, most preferably from about 900 to about 2000 pounds, when measured pursuant to ASTM 3574-$B_1$.

Preferably, frame element 20 is constructed of a polyurethane foam. More preferably, the polyurethane foam of frame element 20 preferably has a specific gravity of less than about 0.40, more preferably in the range of from about 0.10 to about 0.25. Preferably, the liquid foamable polyurethane composition used to produce frame element 20 has a free rise density of from about one to about twenty pounds per cubic foot, more preferably from about two to about eight pounds per cubic foot. For most molded foams, this would give use to a foam core having a density in the range of from about 1.5 to about 24 pcf, more preferably from about 2.5 to about 12 pcf.

Non-limiting and preferred examples of suitable polyurethane foams for use in producing frame element 20 are conventional rigid polyurethane foams.

Generally, the polyurethane foam suitable for use in producing frame element 20 and having the requisite characteristics may be produced from the following general non-limiting formulation:

| Component | Amount |
| --- | --- |
| Polymer Polyol | 100–0 parts |
| Polyol | 0–100 parts |
| Crosslinker | 0–30 parts/100 parts total polyol |
| Catalyst | 0.05 to 3.5 parts/100 parts total polyol |
| Silicone Surfactants | 0–1.5 parts/100 parts total polyol |
| $H_2O$ | 0.5 to 3.5 parts/100 parts total polyol |
| Isocyanate | Adequate quantity for an index of from about .60 to 1.30 ratio of NCO equivalents to the equivalents of NCO reactive sites |

Suitable polymer polyols, polyols and isocyanates are described in U.S. Pat. Nos. 3,304,273, 3,383,351, 353,093, 3,939,106 and 4,134,610, Belgin patent 788,115, Canadian Patent 785,835 and "Polymer/Polyols, a New Class of Polyurethane Intermediate", Kuryla, W. C. et. al., J. Cellular Plastics, March (1996), the contents of which are hereby incorporated by reference. See also, "Flexible Polyurethane Foam" by Herrington et al. (1991), the contents of which are hereby incorporated by reference.

Suitable crosslinkers, catalysts and silicone surfactants are described in U.S. Pat. Nos. 4,107,106 and 4,190,712, the contents of which are hereby incorporated herein by reference.

The preferred polyurethane foam suitable for use in frame element 20 may be produced form the following formulation:

| Component | Amount |
|---|---|
| Polymer Polyol[1] | 20–100 parts |
| Polyol[2] | 0–80 parts |
| Crosslinker[3] | 5–15 parts/100 parts total polyol |
| Catalyst[4] | 0.5 to 1.2 parts/100 parts total polyol |
| Silicone Surfactants[5] | 0.3–1.1 parts/100 parts total polyol |
| $H_2O$ | 1.75 to 2.75 parts/100 parts total polyol |
| Isocyanate[6] | Adequate quantity for an index of from about 0.8 to 1.1 ratio of NCO equivalents to the equivalents of NCO reactive sites |

[1]AC West Virginia Polyol Co. NIAX 31-28
[2]5000 MW propylene oxide adduct of glycerine with 75% primary capping
[3]BASF 953
[4]DABCO R-8020
[5]Goldschmidt B-4113
[6]Dow Chemical Company PAPI 901

Passenger seat 20 further comprises a resilient body 30 which covers frame element 20. Resilient body 30 may be constructed of any material conventionally useful in the production of seats. The resilient body may be made of a foam or non-foam material. Non-limiting examples of useful non foam materials include fibers matrices such as horse hair, organic fibers and the like. The resilient body may also be constructed of any suitable foam material. Ideally, the resilient body is constructed of a relatively low density resilient foam, more preferably a polyurethane foam. Polyurethane foams useful for this purpose are well known in the art.

Passenger seat 10 further comprises a trim cover 35 which covers resilient body 30 and the periphery of frame element 20. Trim cover 35 comprises a tongue member 40 in locking engagement with a groove 15 in frame element 20. The interaction of tongue member 40 and groove 15 will be described in more detail hereinbelow.

Figure 7:
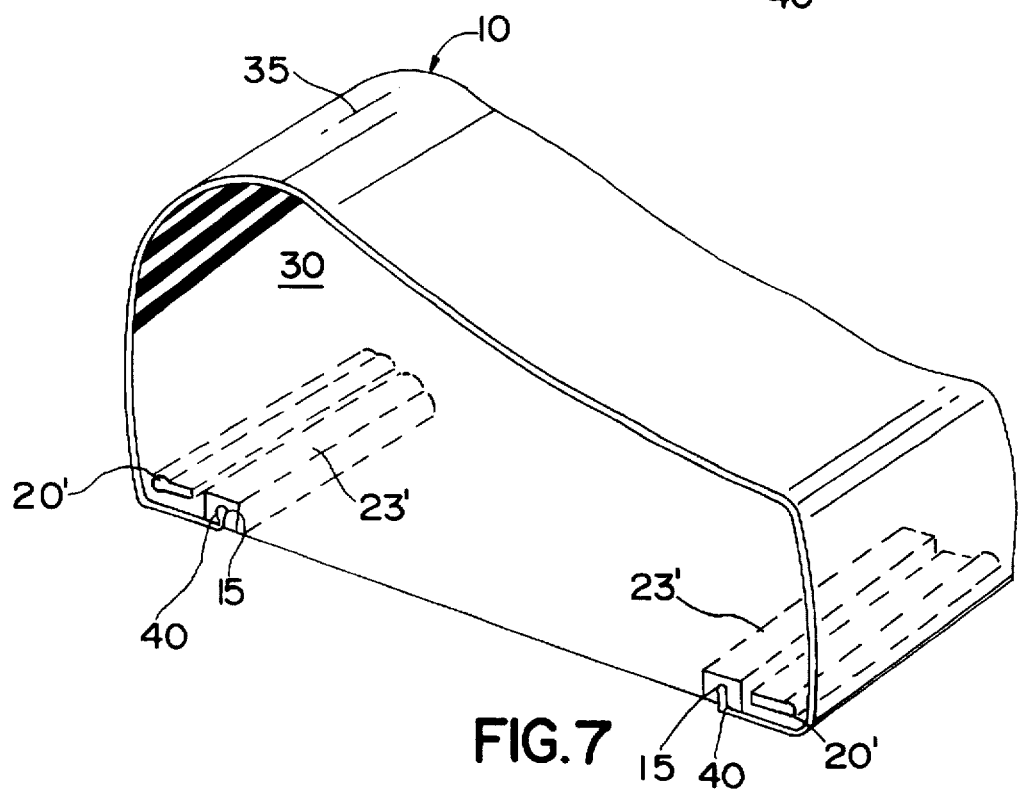
FIG. 7 illustrates a sectional view taken along line VII—VII in FIG. 6.
Figure 6:
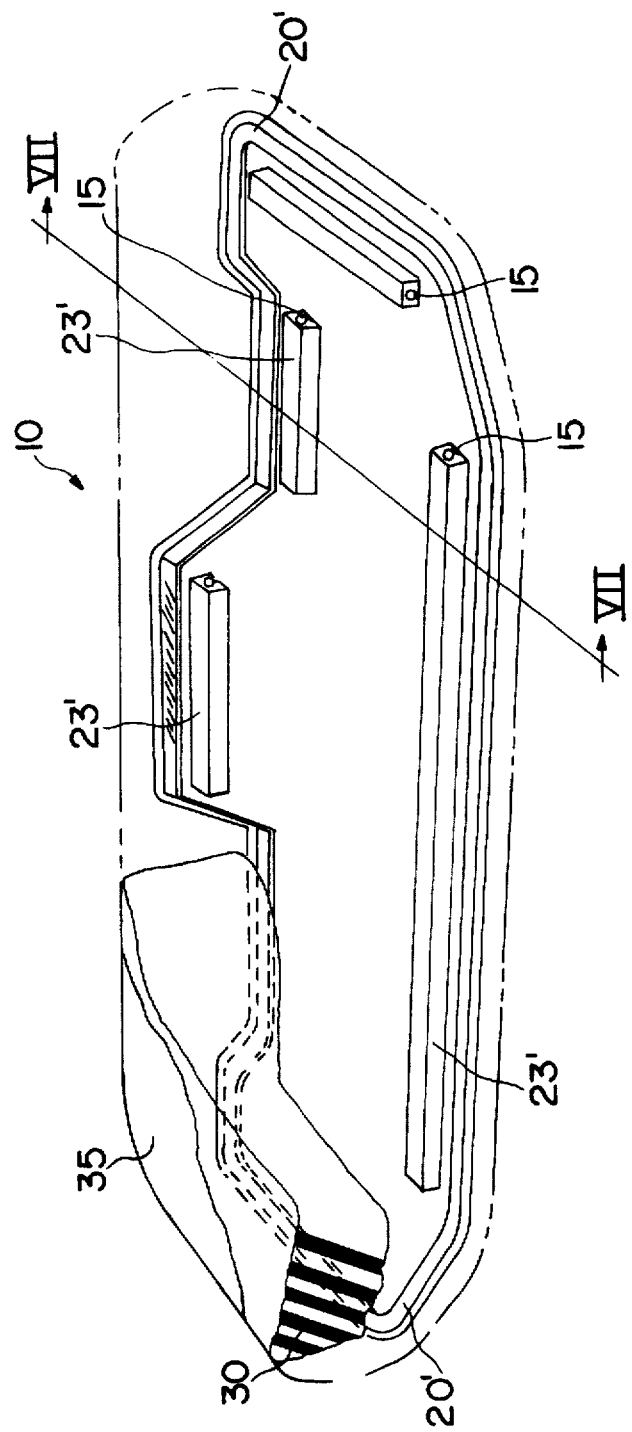
FIG. 6 illustrates a perspective view, in partial cross-section, of another embodiment of the present passenger seat.

With reference to FIGS. 6 and 7, there is illustrated an alternate embodiment of the present passenger seat. In this embodiment, like numerals represent like parts in FIG. 1. The major difference in this embodiment is the use of a rigid, non-foam frame element 20'. Rigid, non-foam frame element 20' is constructed of any suitable material such as metal, plastic and the like. For example, rigid, non foam frame element 20' may be a conventional metal frame. In this embodiment, groove 15 is located in a plurality of rigid foam members 23' which are located at a position correspondingly along the periphery of the underside of passenger seat 10 inside the periphery of rigid frame element 20'. The number and location of rigid foam members 23' is within the purview of a person skilled in the art and should be chosen to provide suitable attachment of trim cover 35. Preferably, rigid foam member 23' is constructed of a foam having the same properties and composition of frame element 20 discussed hereinabove with respect to FIG. 1.

Figure 2:
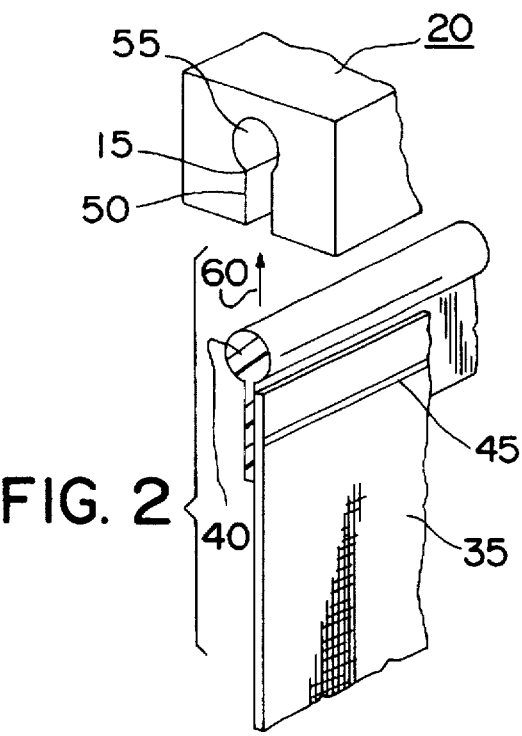
FIG. 2 illustrates a perspective view of an embodiment of a trim cover attachment system for use in the present passenger seat.

With reference to FIG. 2, there is illustrated an enlarge view of trim cover attachment system illustrated in FIG. 1. Tongue member 40 may be construction of any suitable material. Preferably, tongue member 40 is constructed of a plastic material such as polyethylene, polypropylene and the like. The plastic material can be recycled or virgin. Tongue member 40 is attached to trim cover 35 by stitching 45. Those of skill in the art will immediately recognize that the precise manner of attaching tongue member 40 to trim cover 35 is not particularly restricted and variations such as gluing, stapling and the like may be used. Preferably, groove 15 comprises an elongate passageway 50 having an open end to permit entry of tongue member 40 and a closed end 55 having a substantially circular cross-section.

Trim cover 35 may be attached to frame element 20 by inserting tongue member 40 into groove 15 in the direction of arrow 60. Insertion is carried out until the end of tongue member 40 engages closed end 55 of groove 15. At this point, tongue member 40 is in locking engagement with groove 15 of frame element 20. Since frame element 20 is constructed of a foam material, it is possible to withdraw, upon application of sufficient force, tongue member 40, if necessary.

Figure 3:
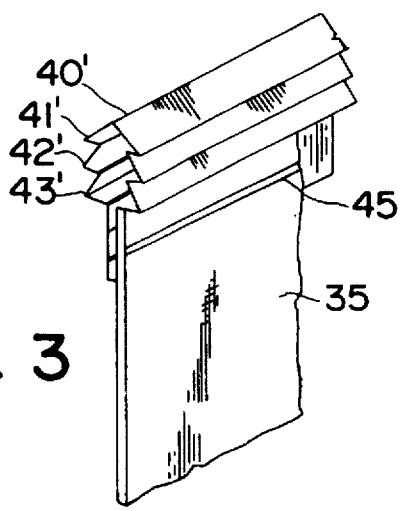
FIGS. 3–5 illustrate perspective views, respectively, of an alternate locking member useful in the trim cover attachment system illustrated in FIG. 2.

With reference to FIG. 3 where there is illustrated an alternate embodiment of tongue member 40 in FIG. 2. Thus, FIG. 3, tongue member 40' comprises three jagged section 41',42',43'. Tongue member 40' may be used with frame element 20 comprising groove 15 as illustrated in FIG. 2.

Figure 4:
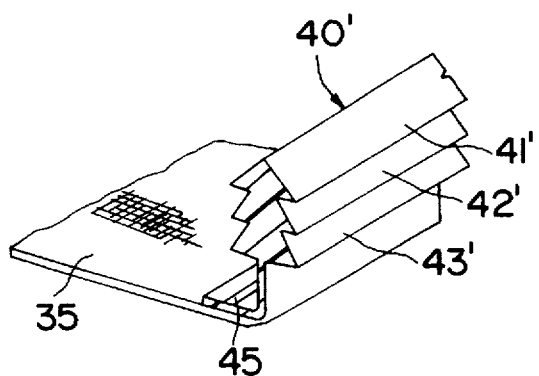

With reference to FIG. 4, there is illustrated an alternative to tongue member 40' illustrated in FIG. 3. Specifically, in FIG. 4, a portion of tongue member 40' which contains jagged sections 41',42', 43' is bent at an angle substantially perpendicular to the remaining portion of tongue member 40' to which is attached trim cover 35. The advantage of the alternative is the provision of a flush fit of trim cover 35 with the underside of frame element 20 of passenger seat 10. This is especially important if tongue member 40 or 40' is constructed of a relatively rigid material which is likely to partially protrude from groove 15 after insertion.

Figure 5:
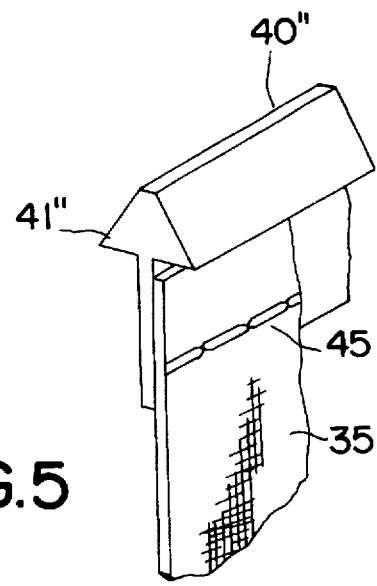

With reference to FIG. 5, there is illustrated yet another embodiment of a tongue member for insertion in groove 15 of frame element 20. In FIG. 5, tongue member 40" comprises a single jagged section 41". Tongue member 40" may be inserted in groove 15 of frame element 20 as described hereinabove.

Of course, the shape and design of various other tongue members will be immediately apparent to those of skill in the art. The shape and design of tongue member 40 is not particularly restricted provided that it, in combination with groove 15, provides an interference fit of sufficient strength that trim cover 35 will not readily detach from frame element 20. Similarly, the precise design of groove 15 is not particularly restricted and, in some cases, may be dictated by design of tongue member 40.

The interference fit provided by the engagement of tongue member 40 with groove 15 should extend along at least a partial periphery of frame element 20. Preferably, this trim cover attachment system extends along substantially all of the periphery of frame element 20. Further, in certain applications, it may be convenient to have groove 15 disposed about substantially the entire periphery of frame element 20 but use judicious placement of tongue member 40 to engage only a portion of groove 15 sufficient to provide the interference fit described above. In such a case, the proportion of tongue member 40 (i.e. with respect to groove 15) and the positioning thereof is within the purview of a person skilled in the art.

Figure 8:
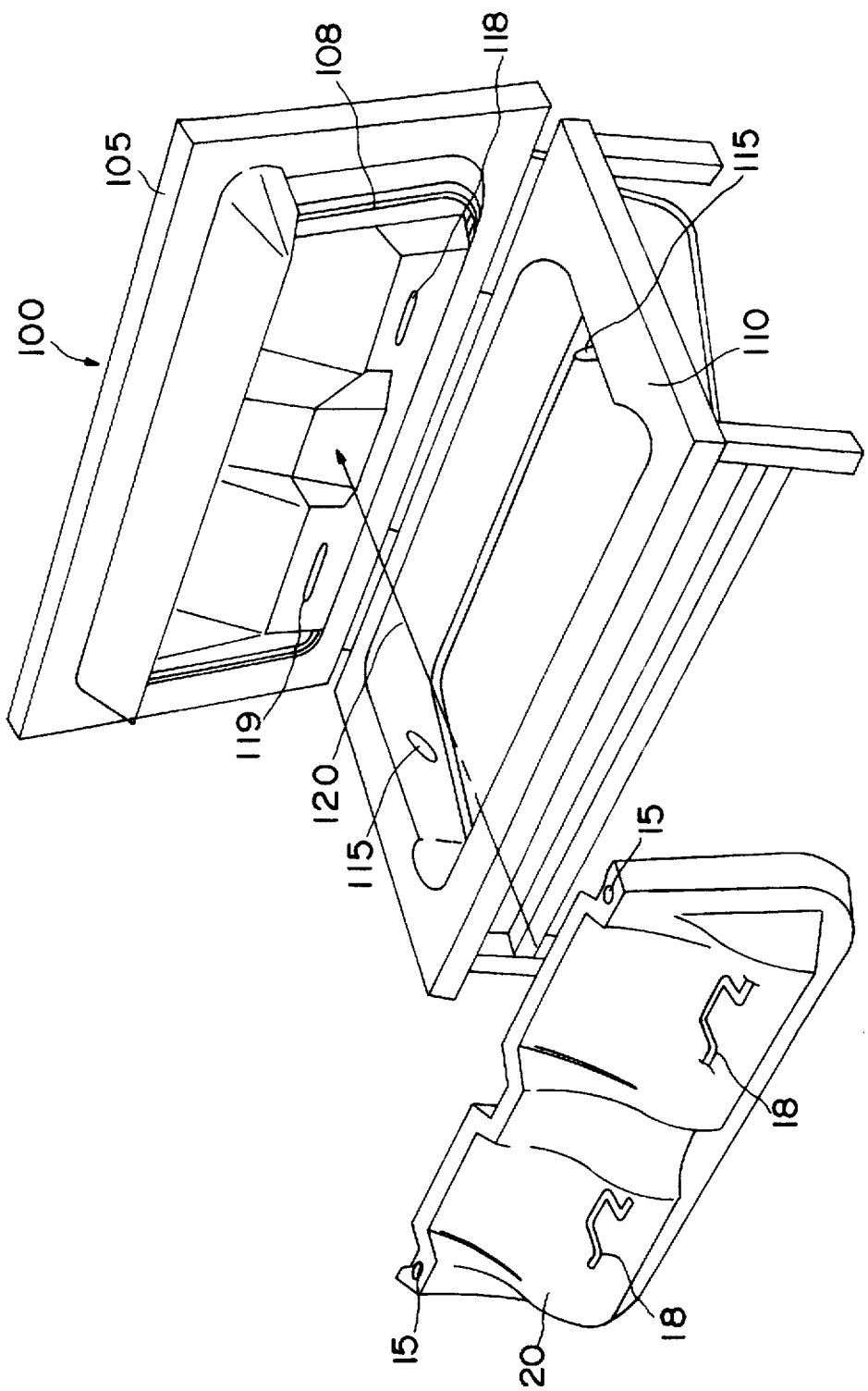
FIG. 8 illustrates a mold useful in the production of the present passenger seat.

With reference to FIG. 8, there is illustrated a step in the process of producing an embodiment of the present passenger seat. Thus, frame element 20, shown with a pair of wire sections 18 which serve to anchor the finished passenger seat to the vehicle (not illustrated in earlier Figures for clarity), is provided. Frame element 20 may be produced utilizing a conventional clam-shelf foam mold which has been suitably adapted to provide groove 15 in frame element 20.

The present passenger seat is preferably produced in a mold 100. Mold 100 comprises an upper mold half 105 (also known in the art as a "lid") and a lower mold half 110 (also known in the art as a "bowl"). Upper mold half 105 and lower mold half 110 are engageable to define a mold cavity in the shape of the passenger seat to be produced.

Upper mold half 105 comprises apertures 118 which are positions to receive wires 18 in frame element 20. Upper mold half 105 further comprises a ridge 108 around the periphery thereof which serves as a dam to ingress of liquid foamable polymeric composition to groove 15 (this will be discussed in more detail hereinbelow).

Lower mold half 110 comprises a pair of projections 115 which are angled into the mold cavity from a side wall of lower mold half 110. The purpose of projections 115 will be discussed in more detail hereinbelow. Frame element 20 is positioned in upper mold half 105 in the direction of arrow 120 such that wires 18 in frame element 20 enter apertures 118 in upper mold half 105.

After placement of frame element 20 on upper mold half 105, a liquid foamable polymeric composition is dispensed in lower mold half 110 (not shown). The manner by which the liquid foamable polymeric composition is dispensed in lower mold half 110 is conventional and is not particularly restricted—see, for example, FIG. 7 of the '490 and '747 patents discussed above and incorporated herein by reference.

The precise nature of the liquid foamable polymeric composition is not particularly restricted. Preferably, the liquid foamable polymeric composition comprises a polyurethane derived from a diphenylmethane diisocyanate (MDI)-based system of low index and a high molecular weight conventional polyol. Such a system is typically completely "water blown" using highly-catalyzed odorless amines and cell regulators. Typically, this system cures at room temperature in about 3 minutes or less. Alternatively, the polyurethane is a toluene diisocyanate (TDI)-based system of low index and of a high molecular weight conventional polyol. When such a TDI-based system is used, the cells of the foam in the finished product should be opened. Opening of such foam cells is within the purview of a person skilled in the art. It can be accomplished by any conventional means such as crushing, kneading, roll pressing, chemical treatment, pressurization and the like of the product while ensuring that the trim cover (if present) is not damaged during this step. It will be appreciated that the liquid foamable polymeric composition may comprise a mixture of MDI based and TDI-based systems.

After the liquid foamable polymeric composition is dispensed into lower mold half 105, the composition begins to expand. At this point, upper mold half 105 and lower mold half 110 are closed.

Figure 9:
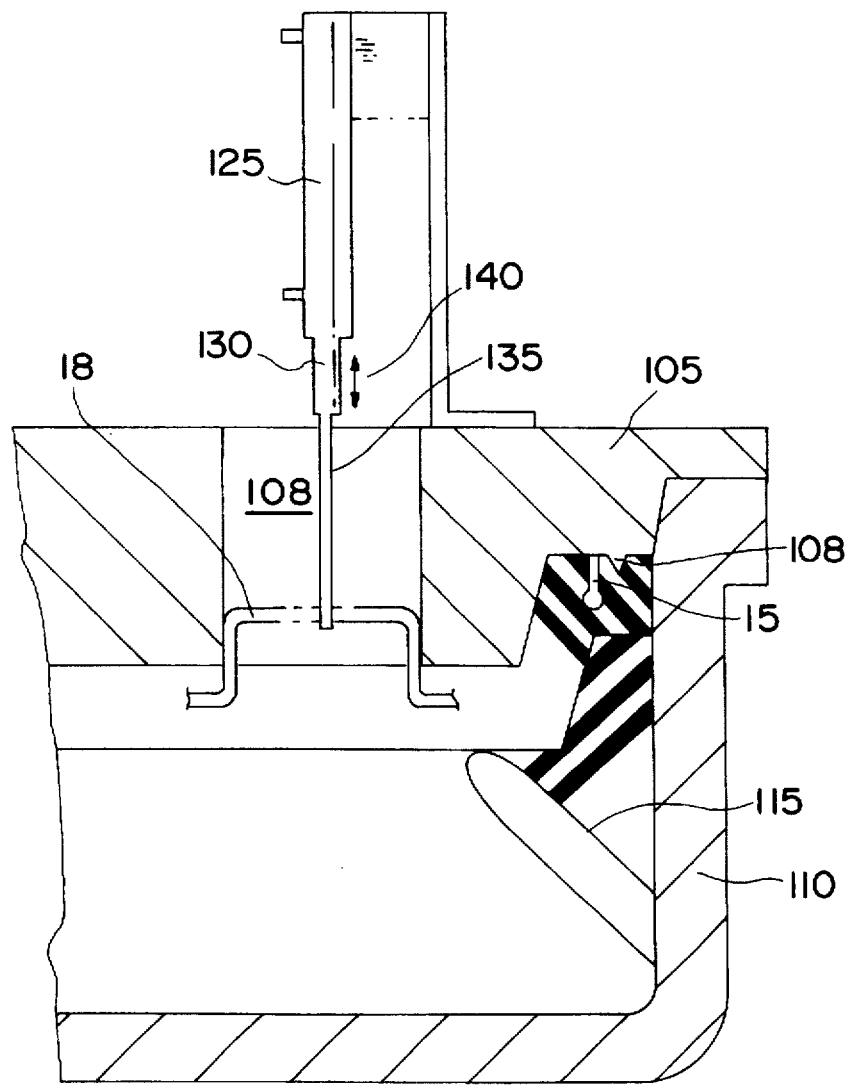
FIG. 9 illustrates and enlarged sectional view of a portion of the mold illustrated in FIG. 8 in a closed position.

Shortly prior to or shortly after closing of upper mold half 105 and lower mold half 110, frame element 20 is preferably pressed against upper mold half 105. This can be accomplished in a number of ways. Preferably, pressing may be accomplished by pulling wires 18 through apertures 118 in a direction away from the mold cavity. This is best illustrated in FIG. 9. Specifically, a cylinder 125 having a movable piston 130 is connected to wire 18 via a link 135. Cylinder 125 may be pneumatically or hydraulically operated to actuate piston 130 in the directions shown at arrow 140. Thus, when it is desired to produce the passenger seat, cylinder 125 is operated to retract piston 130 away from the mold cavity thereby pressing frame element 20 against upper mold half 105.

Alternatively, frame element 20 may pressed against upper mold half 105 by projections 115. As illustrated in FIG. 9, when upper mold half 105 and lower mold half 110 are closed, projections 115 press frame element 20 against upper mold half 105.

In certain cases, it may be desirable to use both cylinder 125 and projections 115 in combination to press frame element 20 against upper mold half 105.

Regardless of the mode by which frame element 20 is pressed against upper mold half 105, the pressing means should be designed so as to establish an "interference seal" between ridge 108 in upper mold half 105 and frame element 20. Specifically, upon the application of sufficient pressing force, ridge 108 will be compressibly forced against frame element 20 to provide a seal against ingress of liquid foamable polymeric composition into groove 15.

The present inventors have discovered that, if no steps are taken to seal the periphery of frame element 20 during expansion of the liquid foamable polymeric composition, the latter will flow into and clog groove 15 thereby rendering it unsuitable for application of a trim cover.

Those of skill in the art will readily recognize that the precise shape of ridge 108 is not particularly restricted. The present inventors have discovered that a ridge having a pointed apex is convenient since minimal pressing force is required to obtain the "interference seal" referred to above. Preferable, the ridge has a height less than about 10 mm, more preferably in the range of from about 2 to about 8 mm, even more preferably in the range of from about 2 to about 6 mm, most preferably in the range of from about 2 to about 4 mm.

As illustrated in FIG. 9, use of such a "interference seal" obviates ingress into groove 15 of liquid foamable polymeric composition which forms resilient body 30.

During expansion of the liquid foamable polymeric composition, it is preferred that mold 100 be vented to exhaust expansion gasses formed during the reaction of the composition. Such venting is conventional—see, for example, U.S. Pat. No. 5,482,721 [Clark et al.], the contents of which are hereby incorporated by reference.

Upon completion of expansion of the liquid foamable polymeric composition, the foam seat product may be removed from mold 100. Thereafter, trim cover 35 may be applied to the foam product. Preferably, this is done by compressing the foam product and then inserting tongue member 40 into groove 15.

Optionally, the present process can be combined with conventional "foam in-place" processes which serve to bond resilient body 30 to trim cover 35 at the upper surface of seat 10. This would supplement attachment of the cover 35 to frame element 20. See for example the '490 and '747 patents discussed above and incorporated herein by reference, and U.S. Pat. No. 5,132,063 [Hughes], the contents of which are hereby incorporated by reference.

Preferably resilient body 30 is bonded to frame element 20. However, it is possible to utilize trim cover 35 to mechanically secure resilient body 30 with respect to frame element 20. Optionally, such trim cover attachment can by supplemented by bonding trim cover 35 to resilient body 30—see, for example, U.S. Pat. Nos. 5,089,191 [Hughes]

and 5,096,639 [Hughes], the contents of each of which are hereby incorporated by reference.

While specific embodiments of the present invention have been described hereinabove, those skilled in the art will recognize that a number of modifications and variations are possible without departing from the spirit and scope of the invention.

For example, in the present process, it is possible to substitute frame element 20 with a combination of a conventional metal frame and rigid foam members 23'. In this case, the passenger seat would be produced by fixing the rigid frame member and the rigid foam member to the upper mold half and foaming the liquid foamable polymeric composition in a manner such that the resulting resilient body adheres to the rigid frame element and the rigid foam members. In this instance, ridge 108 can be formed of a non-rigid material such that upon pressing against the rigid frame member, the advantageous "interference seal" is formed.

Further, those of skill in the art will appreciate that various embodiments are possible for the trim cover attachment system. Generally, the trim cover attachment system useful herein is based on the provision of a groove which is adapted to receive and engage a tongue or similar member.

Further, it is possible to modify the present process such that use is made of a foam frame element which has embedded therein a metal wire or the like for fixation to the trim cover. In this instance, the "interference seal" produced by pressing the frame element against the upper mold half would be to retain a portion of the metal wire exposed for later attachment to the trim cover. It should be appreciated that this embodiment is less advantageous than the one described hereinabove relating to the provision of a groove in the foam frame element. Specifically, provision of such a groove results in the elimination of a metal part from the foam seat product—this is always desirable from an engineering viewpoint. Further, elimination of metal from the foam seat product improves the recyclability of the foam seat product.

Still further, it is possible to produce the present passenger seat with or without at least one pelvic support element connected to the frame element. If the pelvic support element is to be used, it is preferred that it be integrally molded with the foam frame element. Further, it is preferred that the vehicle attachment wire (or other means) be molded into the frame element.

Still further, it is contemplated that, in certain applications it is desirable that the underside (i.e. the side of the seat opposite the trim cover) of the seat have structural properties (i.e. able to bend but not break) properties. This is especially desirable if the passenger seat is to be used in a seatback application which is devoid of a metal frame. In such an application, the design challenge is to mitigate the occurrence of projection of heavy articles in the trunk of the vehicle through the rear passenger seat (i.e. the seatback) upon impact of the vehicle. In such cases, it may be desirable and preferred to incorporate a reinforcing layer on one or both of the major surfaces of the foam frame element.

The choice of reinforcing layer is not particularly restricted and may be non-metal or a metal. Preferably, the reinforcing layer is flexible and, more preferably, permeable (i.e. to air, water, etc.). The flexible reinforcing layer may be fibrous or non-fibrous. Non-limiting example of fibrous reinforcing layers include at least one member selected from the group consisting essentially of glass fibers (e.g. in the form of a cloth or a mat, chopped or unchopped, such as Nico 754 1 oz/ft$^2$), polyester fibers, polyolefin fibers (e.g. polyethylene and polypropylene), Kevlar fibers, polyamides fibers (e.g. nylon), cellulose fibers (e.g. burlap), carbon fibers, cloth materials such as spun bound polyesters (e.g. Lutravil 1DH7210B/LDVT222 and Freudenberg PRLD/585G/PTLD600B) and paper (e.g. Kraft #60). It will be appreciated that the fibrous reinforcing layer may be woven of non-woven. Non-limiting example of non-fibrous reinforcing layer comprise at least one member selected from the group consisting essentially of thermosets (e.g. polyurethanes, polyesters and epoxies), metals such as aluminum foil, polycarbonates (e.g. Lexan and Dow Calibre), polycarbonate/ABS alloys (e.g. Dow Pulse), ABS terpolymers (e.g. Royalite 59 and Dow Magnum), polyester terphthalate (PET), vinyl, styrene maleic anhydride (e.g. Arco Dylark), and fiberglass reinforced polypropylene (e.g. Azdel). It will be appreciated that many non-fibrous reinforcing layer materials may themselves be reinforced with fibrous materials and thus, the flexible reinforcing layer may be a combination of fibrous and non-fibrous materials, either mixed or composite in construction. The manner of incorporating a reinforcing layer on a polyurethane foam such as the one used in frame element 20 is disclosed, inter alia, in U.S. Pat. No. 5,389,316 [Kerman], the contents of which are hereby incorporated by reference.

Other modification and variations within the scope and spirit of the invention will be apparent to those of skill in the art.

What is claimed is:

1. A process for producing a passenger seat in a mold comprising a first mold half and a second mold half engageable to define a mold cavity, the process comprising the steps of:
   (i) placing a frame element in the first mold half, the frame element having connected thereto vehicle anchorage means;
   (ii) providing a relatively high density, rigid foam trim cover attachment means in the first mold half, the trim cover attachment means having a groove disposed in a surface thereof, the groove capable of receiving trim cover connection means;
   (iii) dispensing a liquid foamable polymeric composition in at least one of the first mold half and the second mold half;
   (iv) closing the first mold half and the second mold half;
   (v) sealing at least a portion of the trim cover attachment means to prevent ingress of the liquid foamable polymeric composition into said groove; and
   (vi) allowing the liquid foamable polymeric composition to expand to fill substantially the mold cavity to produce a relatively low density, resilient seat body which is fixed to at least a portion of the frame element.

2. The process defined in claim 1, wherein the frame element comprises a relatively high density, rigid foam and is integral with the trim cover attachment means.

3. The process defined in claim 1, wherein the frame element is constructed of non-cellular rigid material and the trim cover attachment means comprises a relatively high density, rigid foam member having a groove disposed in a surface thereof, the groove capable of receiving a tongue member attached to a trim cover.

4. The process defined in claim 1, wherein the trim cover attachment means comprises a wire attached to the frame element, the wire having at least a portion thereof exposed for attachment via connection means to a trim cover.

5. The process defined in claim 4, wherein the wire is of a dimension which permits use of connection means comprising a plurality of metal rings.

6. The process defined in claim 1, wherein Step (v) comprises providing a seal between a portion of the frame element and the first mold half which is peripheral with respect to the trim cover attachment means.

7. The process defined in claim 6, wherein the seal is a dam provided on the first mold half.

8. The process defined in claim 6, wherein the seal is a dam provided on the frame element.

9. The process defined in claim 1, comprising pressing the frame element against the first mild half during expansion of the liquid foamable polymeric composition.

10. The process defined in claim 1, wherein the second mold half comprises a member projecting into the mold half, the member pressing the frame against the first mold half after Step (iv).

11. The process defined in claim 1, wherein the second mold half comprises a plurality of members projecting into the mold half, the members pressing the frame element against the first mold half and Step (iv).

12. The process defined in claim 1, wherein the vehicle anchorage means is embedded in the frame element.

13. The process defined in claim 1, wherein the frame element is pressed against the first mold half by pulling the vehicle anchorage means through the first mold half.

14. The process defined in claim 1, wherein Step (i) further comprises placing at least one pelvic support element in the first mold half.

15. The process defined in claim 14, wherein the at least one pelvic support element is integrally molded with the frame element.

16. The process defined in claim 1, further comprising the step of (vii) applying a trim cover to the seat body.

17. The process defined in claim 1, wherein Step (vi) comprises expanding the liquid foamable composition in a direction toward the frame element.

18. The process in claim 1, wherein Step (ii) comprises placing the frame element in an upper mold, and Step (iii) comprises dispensing the liquid foamable polymeric composition in a lower mold half.

19. A process according to claim 1, wherein said step of providing a relatively high density, rigid foam trim cover attachment means comprises the step of providing a trim cover attachment means with a groove which is narrower at a top thereof than a bottom thereof.

20. A process for producing a seat in a mold having a first mold half and a second mold half which together define a mold cavity, comprising the steps of:

placing a substantially rigid foam frame element in the first mold half, the frame element having vehicle anchorage means connected thereto;

providing a substantially rigid foam trim cover attachment groove in the first mold half, the groove adapted for receiving a trim cover connector;

dispensing a liquid foamable polymeric composition in the mold cavity;

closing the first mold half and the second mold half;

sealing at least a portion of the trim cover attachment groove to prevent ingress of the liquid foamable polymeric composition from between the first mold half and the second mold half into the groove; and allowing the liquid foamable polymeric composition to expand to fill the mold cavity to produce a substantially resilient seat body which is fixed to at least a portion of said frame element.

* * * * *